United States Patent
Moussa

(10) Patent No.: US 12,247,094 B2
(45) Date of Patent: *Mar. 11, 2025

(54) FLAME RESISTANT BUILD MATERIALS AND ASSOCIATED PRINTED 3D ARTICLES

(71) Applicant: 3D Systems, Inc., Rock Hill, SC (US)

(72) Inventor: Khalil Moussa, Rock Hill, SC (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,187

(22) Filed: Jan. 10, 2024

(65) Prior Publication Data

US 2024/0174781 A1  May 30, 2024

Related U.S. Application Data

(63) Continuation of application No. 17/545,706, filed on Dec. 8, 2021, now Pat. No. 11,905,355.

(60) Provisional application No. 63/123,739, filed on Dec. 10, 2020.

(51) Int. Cl.
| | |
|---|---|
| *C08F 222/22* | (2006.01) |
| *B29C 64/106* | (2017.01) |
| *B33Y 10/00* | (2015.01) |
| *B33Y 70/00* | (2020.01) |
| *B33Y 80/00* | (2015.01) |
| *C08K 5/00* | (2006.01) |
| *C08K 5/521* | (2006.01) |

(52) U.S. Cl.
CPC .......... *C08F 222/22* (2013.01); *B29C 64/106* (2017.08); *B33Y 70/00* (2014.12); *B33Y 80/00* (2014.12); *C08K 5/0066* (2013.01); *C08K 5/521* (2013.01); *B33Y 10/00* (2014.12)

(58) Field of Classification Search
CPC ..... C08F 222/22; B29C 64/106; B33Y 70/00; B33Y 80/00; B33Y 10/00; C08K 5/0066; C08K 5/521
See application file for complete search history.

(56) References Cited

U.S. PATENT DOCUMENTS

| | | | |
|---|---|---|---|
| 11,905,355 B2 * | 2/2024 | Moussa ................ | C09D 11/38 |
| 2008/0070159 A1 | 3/2008 | Ramos | |
| 2014/0131908 A1 | 5/2014 | Sun et al. | |
| 2018/0155530 A1 | 6/2018 | King et al. | |
| 2020/0247932 A1 | 8/2020 | Share et al. | |
| 2022/0315706 A1 | 10/2022 | Bowman | |

FOREIGN PATENT DOCUMENTS

| | | |
|---|---|---|
| JP | 2019-532129 A | 11/2019 |
| WO | 03/005126 A1 | 1/2003 |
| WO | 2006/107759 A2 | 10/2006 |
| WO | 2011/114884 A1 | 9/2011 |
| WO | 2017/006173 S1 | 1/2017 |

OTHER PUBLICATIONS

PCT International Search Report for PCT Application No. PCT/US2021/062413, mailed Mar. 18, 2022 (6 pages).
PCT Written Opinion for PCT Application No. PCT/US2021/062413, mailed Mar. 18, 2022 (5 pages).
English translation of WO201114884 from EPO on Mar. 14, 2022 (46 pages).
English Translation of First Japanese Office Action for Japanese Application No. 2023-534120, dated Jul. 29, 2024 (3 pages).
European Patent Office (EPO) machine translation for Japanese Application No. 20190510314 (Japanese Publication No. 20200247932).
Emilia Hola et al., "New, highly versatile bimolecular photoinitiating systems for free-radical, cationic and thiolene photopolymerization processes under low light intensity UV and visible LEDs for 3D printing application", RSC Advances, 2020, vol. 10, No. 13, p. 7509-7522, DOI: 10.1039/c9ra10212d.

* cited by examiner

*Primary Examiner* — Catherine S Branch
(74) *Attorney, Agent, or Firm* — Maynard Nexsen PC; John P. Zimmer

(57) ABSTRACT

Polymerizable liquids for 3D printing applications are described herein which, in some embodiments, impart flame resistant and/or flame retardant properties to articles printed from the build materials. The polymerizable liquids may also impart desirable mechanical properties to the articles. In some embodiments, a polymerizable liquid comprises a curable isocyanurate component in an amount of at least 20 wt. %, based on total weight of the polymerizable liquid, and an organophosphate component comprises one or more organophosphate compounds. In some embodiments, the polymerizable liquid further comprises an acrylate component.

13 Claims, No Drawings

US 12,247,094 B2

FLAME RESISTANT BUILD MATERIALS AND ASSOCIATED PRINTED 3D ARTICLES

CROSS REFERENCE TO RELATED APPLICATIONS

The present application is a continuation of U.S. patent application Ser. No. 17/545,706, filed Dec. 8, 2021, which claims priority pursuant to 35 U.S.C. § 119 to U.S. Provisional Patent Application No. 63/123,739, filed Dec. 10, 2020, each of which is hereby incorporated by reference in its entirety.

FIELD

The present invention relates to three-dimensional build materials and, in particular, to polymerizable liquids imparting flame resistant or flame retardant properties to articles printed from the polymerizable liquids.

BACKGROUND 3D printers employ build materials, which are also known as inks, to form various 3D objects, articles, or parts in accordance with computer generated files. In some instances, the build material is solid at ambient temperatures and converts to liquid at elevated jetting temperatures. In other instances, the build material is liquid at ambient temperatures.

Build materials can comprise a variety of chemical species. Selection of chemical species to include in a build material can be selected according to various considerations including, but not limited to, desired chemical and/or mechanical properties of the printed article and operating parameters of the 3D printing apparatus. For example, ultra-violet (UV) curable acrylate formulations generally can print parts with high resolution on DLP systems. However, in many cases, the resulting parts lack desirable mechanical properties and can be prone to fracture or other degradative pathways. Such degradative pathways compromise article performance, leading to premature failure.

Additionally, some build materials and resultant articles printed from the build materials can be unsuitable for high temperature applications and/or other applications necessitating combustion resistance. As a result, 3D printing technology may find limited application in fields requiring flame resistant or flame retardant materials and articles.

SUMMARY

In view of the foregoing, polymerizable liquids for 3D printing applications are described herein which, in some embodiments, impart flame resistant and/or flame retardant properties to articles printed from the liquids, including when such polymerizable liquids are used as a build material or ink. The polymerizable liquids may also impart desirable mechanical properties to the articles. In some embodiments, a polymerizable liquid comprises a curable isocyanurate component in an amount of at least 20 wt. %, based on total weight of the polymerizable liquid, and an organophosphate component comprising one or more organophosphate compounds. In some embodiments, the polymerizable liquid further comprises an acrylate component. The acrylate component can comprise acrylate monomer, acrylate oligomer, or mixtures thereof.

Additionally, methods of printing three-dimensional articles are described herein. A method, in some embodiments, comprises providing a polymerizable liquid comprising a curable isocyanurate component in an amount of at least 20 wt. % percent, based on total weight of the polymerizable liquid, and an organophosphate component comprising one or more organophosphate compounds. The polymerizable liquid is printed and cured to form the article. In some embodiments, the article is formed via a layer-by-layer process, wherein layer formation is administered via deposition and curing of a layer of the polymerizable liquid. In some embodiments, the polymerizable liquid also comprises an acrylate component. The acylate component can comprise acrylate monomer, acrylate oligomer, or mixtures thereof.

As described further herein, the polymerizable liquid may further comprise a photoinitiator component, and curing of the polymerizable liquid may occur by irradiation of the liquid with light of the appropriate wavelength to initial free radical polymerization.

These and other embodiments are further described in the following detailed description.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

It is also to be understood that the article "a" or "an" refers to "at least one," unless the context of a particular use requires otherwise.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other additive manufacturing techniques now known in the art or that may be known in the future that use a build material or ink to fabricate three-dimensional objects.

Definitions

The term "alkyl" as used herein, alone or in combination, refers to a straight or branched saturated hydrocarbon group optionally substituted with one or more substituents. For example, an alkyl can be $C_1$-$C_{30}$ or $C_1$-$C_{18}$, where the subscript refers to the number of carbon atoms.

The term "alkenyl" as used herein, alone or in combination, refers to a straight or branched chain hydrocarbon group having at least one carbon-carbon double bond and optionally substituted with one or more substituents.

The term "alkynyl" as used herein, alone or in combination, refers to a straight or branched chain hydrocarbon group having at least one carbon-carbon triple bond and optionally substituted with one or more substituents.

The term "aryl" as used herein, alone or in combination, refers to an aromatic monocyclic or multicyclic ring system optionally substituted with one or more ring substituents.

The term "heteroaryl" as used herein, alone or in combination, refers to an aromatic monocyclic or multicyclic ring system in which one or more of the ring atoms is an element other than carbon, such as nitrogen, boron, oxygen and/or sulfur.

The term "heterocycle" as used herein, alone or in combination, refers to a mono- or multicyclic ring system in which one or more atoms of the ring system is an element other than carbon, such as boron, nitrogen, oxygen, and/or sulfur or phosphorus and wherein the ring system is optionally substituted with one or more ring substituents. The heterocyclic ring system may include aromatic and/or non-aromatic rings, including rings with one or more points of unsaturation.

The term "heteroalkyl" as used herein, alone or in combination, refers to an alkyl moiety as defined above, having one or more carbon atoms, for example one, two or three carbon atoms, replaced with one or more heteroatoms, which may be the same or different.

The term "heteroalkenyl" as used herein, alone or in combination, refers to an alkyl moiety as defined above, having one or more carbon atoms, for example one, two or three carbon atoms, replaced with one or more heteroatoms, which may be the same or different.

The term "cycloalkyl" as used herein, alone or in combination, refers to a non-aromatic, mono- or multicyclic ring system optionally substituted with one or more ring substituents.

In one aspect, polymerizable liquids for use in 3D printing applications are described herein. The polymerizable liquids, for example, can be employed in digital light processing (DLP), stereolithography (SLA), and multi-jet printing (MJP) printing applications, in some embodiments. A polymerizable liquid comprises a curable isocyanurate component in an amount of at least 20 wt. % based on total weight of the polymerizable liquid, and an organophosphate component comprising one or more organophosphate compounds.

Turning now to specific components, the curable isocyanurate component can comprise any curable isocyanurate not inconsistent with the technical objectives described herein. In some embodiments, the curable isocyanurate comprises one or a mixture of isocyanurate species.

Curable isocyanurates comprise at least one moiety or functionality operable to participate in the polymerization process. In some embodiments, the isocyanurate can comprise a plurality of polymerizable moieties or functionalities. A "polymerizable moiety," for reference purposes herein, comprises a moiety that can be polymerized or cured to provide a printed 3D article or object. Such polymerizing or curing can be carried out in any manner not inconsistent with the objectives of the present disclosure. Polymerizable moieties or functionalities can comprise those operable to undergo non-radiative induced polymerization mechanisms, including polycondensation or reaction between isocyanate and hydroxyl, for example. In some embodiments, the curable isocyanurate can comprise one or more reactive functionalities including, but not limited to, epoxy, amine, and thiol. Alternatively, one or more polymerizable functionalities can comprise one or more points of unsaturation suitable for free radical polymerization. The isocyanurate, in some embodiments, is an isocyanurate acrylate or isocyanurate polyacrylate. In some embodiments, an isocyanurate polyacrylate is of Formula I:

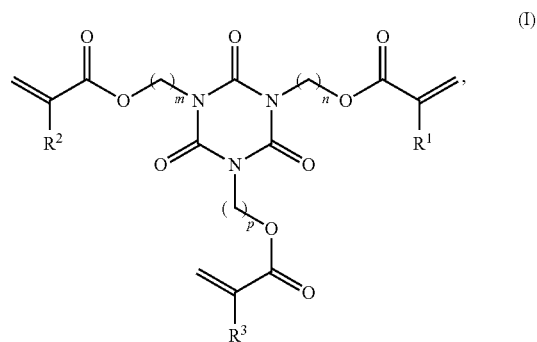

wherein $R^1$-$R^3$ are each independently selected from the group consisting of hydrogen and alkyl and m, n, and p are each integers independently ranging from 1 to 10.

In some embodiments, the isocyanurate is an allyl isocyanurate, such as a polyallyl isocyanurate. A polyallyl isocyanurate, in some embodiments, is of Formula II:

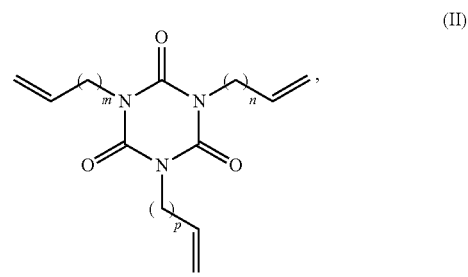

wherein m, n, and p are integers independently ranging from 1 to 10.

In some embodiments, the curable isocyanurate is present in an amount of 30-80 wt. % or 35-70 wt. %, based on total weight of the polymerizable liquid.

In addition to the curable isocyanurate component, the polymerizable liquid comprises an organophosphate component comprising one or more organophosphate compounds. Any organophosphate consistent with imparting flame resistant or flame retardant properties to polymerizable liquids and articles printed from the polymerizable liquids can be employed.

In some embodiments, the one or more organophosphate compounds fall under the following formula, Formula III:

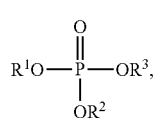

wherein $R^1$-$R^3$ are each independently selected from the group consisting of hydrogen, alkyl, alkenyl, alkynyl, cycloalkyl, heteroalkyl, heteroalkenyl, heterocyclyl, aryl, and heteroaryl. In some embodiments, for example, the one or more organophosphate compounds comprise aryl phosphate or heteroaryl phosphate. Aryl phosphates, in some embodiments, can include triphenyl phosphate. Moreover, in some embodiments, the one or more phosphates comprise bis(organophospates). Bis(organophosphates) can include resorcinol bis(diphenyl phosphate), bisphenol A bis(diphenyl phosphate) or mixtures thereof, in some embodiments.

Organophospate compounds of the polymerizable liquid, in some embodiments, are not halogenated. The organophosphate compounds, for example, are not halogenated with fluorine, chlorine, or bromine.

The organophosphate component can be present in the polymerizable liquid in any desired amount. In some embodiments, the organophosphate component is present in an amount of 10-40 wt. % or 20-40 wt. % based on total weight of the polymerizable liquid.

As described herein, the polymerizable liquid can further comprise an acrylate component in addition to the curable isocyanurate and organphosphate component. The acrylate component can comprise one or a mixture of light polymerizable acrylate species. In some embodiments, for example, the acrylate component can comprise acrylate monomer, acrylate oligomer, or mixtures thereof. As known to the skilled artisan, a monomer is a single structural unit of a polymer or copolymer and is not an oligomer or polymer. In contrast, an oligomer comprises a plurality of chemically linked monomers. In some embodiments, the acrylate component can comprise monofunctional acrylates, difunctional acrylates, or mixtures thereof. In some embodiments, for instance, the acrylate component comprises methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth)acrylate, tetrahydrofurfuryl methacrylate, isobornyl (meth)acrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or mixtures thereof. In some embodiments, the acrylate component comprises a monofunctional or difunctional aliphatic urethane (meth)acrylate.

The acrylate component, in some embodiments, can comprise one or more of allyl acrylate, allyl methacrylate, triethylene glycol di(meth)acrylate, tricyclodecane dimethanol diacrylate, and cyclohexane dimethanol diacrylate. Additionally, in some embodiments, the acrylate component comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis (4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

Additional non-limiting examples of species suitable for inclusion in the acrylate component comprise the following: isobornyl acrylate (IBOA), commercially available from SARTOMER under the trade name SR 506A; difunctional acrylate commercially available from SARTOMER under the SR 833S trade designation; trifunctional acrylate monomer commercially available from SARTOMER under the SR 533 trade designation; isobornyl methacrylate, commercially available from SARTOMER under the trade name SR 423A; alkoxylated tetrahydrofurfuryl acrylate, commercially available from SARTOMER under the trade name SR 611; monofunctional urethane acrylate, commercially available from RAHN USA under the trade name GENOMER 1122; aliphatic urethane diacrylate, commercially available from ALLNEX under the trade name EBECRYL 8402; difunctional aliphatic urethane (meth)acrylate, commercially available from DYMAX under the BR-952 trade designation; triethylene glycol diacrylate, commercially available from SARTOMER under the trade name SR 272; and triethylene glycol dimethacrylate, commercially available from SARTOMER under the trade name SR 205. Other commercially available curable components may also be used. In addition, in some cases, a monofunctional or difunctional acrylate comprises an aliphatic polyester urethane acrylate oligomer, a urethane (meth)acrylate resin, and/or an acrylate amine oligomeric resin, such as EBECRYL 7100. In some embodiments, the acrylate component comprises one or more acrylate derivatives such as acryloylmorpholine.

In addition to the monofunctional and difunctional acrylate species components described above, it is also possible, in some cases, to include trifunctional or higher functional acrylate species in a polymerizable liquid described herein. For example, in some instances, one or more tri(meth) acrylates may be used. However, it is to be understood that the functionality (i.e., mono-, di-, tri-, or higher functionality) and the molecular weight of the acrylate species described herein can be selected to provide a build material having a viscosity suitable for use in a desired 3D printing system. Non-limiting examples of trifunctional or higher (meth)acrylates that may be suitable for use in some embodiments described herein include 1,1-trimethylolpropane tri(meth)acrylate, ethoxylated or propoxylated 1,1,1-trimethylolpropanetri(meth)acrylate, ethoxylated or propoxylated glycerol tri(meth)acrylate, pentaerythritol monohydroxy tri(meth)acrylate, dipentaerythritol monohydroxy penta(meth)acrylate, bis(trimethylolpropane) and tetra(meth)acrylate.

The acrylate component can be present in the polymerizable liquid in any amount consistent with the objectives described herein. In some embodiments, the acrylate component is present in an amount in an amount up to about 70 wt. %. For example, the acrylate component can be present in an amount of 30-70 wt. %, or 40-60 wt. %, based on total weight of the polymerizable liquid.

A polymerizable liquid described herein, in some embodiments, can further comprise a photoinitiator component for initiating polymerization of one or more components of the liquid upon exposure to light of the proper wavelength. In some embodiments, the photoinitiator component can initiate polymerization of the isocyanurate comprising one or more moieties polymerizable via free radical mechanisms, such as the isocyanurate acrylate. Similarly, a photoinitiator can be employed to polymerize the acrylate component. In some embodiments, the curable isocyanurate can be copolymerized with the acrylate component. In other embodiments, the curable isocyanurate and acrylate component are polymerized independently.

Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 420 nm or between about 300 nm and about 385 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Suitable photoinitiators can also comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, suitable photoinitiators comprise those operable for use with an Ar laser radiation source including benzil ketals, such as benzil dimethyl ketal. In some embodiments, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some instances, comprises ionic dye-counter ion compounds capable of absorbing actinic radiation and generating free radicals for polymerization initiation. In some embodiments, polymerizable liquids containing ionic dye-counter ion compounds can be polymerized upon exposure to visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530; and 4,772,541.

A photoinitiator can be present in a polymerizable liquid described herein in any amount not inconsistent with the objectives of the present disclosure. In some embodiments, a photoinitiator is present in an amount of up to about 5 wt. %, based on the total weight of the polymerizable liquid. In some cases, a photoinitiator is present in an amount ranging from about 0.1 wt. % to about 5 wt. %.

Moreover, in some embodiments, a polymerizable liquid described herein can further comprise one or more sensitizers. A sensitizer can be added to increase the effectiveness of one or more photoinitiators that may also be present. Any sensitizer not inconsistent with the objectives of the present disclosure may be used. In some cases, a sensitizer comprises isopropylthioxanthone (ITX) or 2-chlorothioxanthone (CTX).

A sensitizer can be present in the polymerizable liquid in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the polymerizable liquid.

In some embodiments, one or more UV-absorbers and/or light stabilizers can be present in the polymerizable liquid. In some embodiments, for example, one or more UV-absorbers and/or light stabilizers can be present in an amount of 0.1-2 wt. %, based on the total weight of the polymerizable liquid. In some embodiments, UV-absorbers and/or light stabilizers are commercially available from BASF of Florham Park, New Jersey under the TINUVIN® trade-designation.

In another aspect, methods of printing a 3D article or object are described herein. Methods of printing a 3D article or object can include forming the 3D article from a plurality of layers of a polymerizable liquid described herein in a layer-by-layer manner. Any polymerizable liquid or component described herein may be used in the fabrication of the article by additive manufacturing.

A method, in some embodiments, comprises providing a polymerizable liquid comprising a curable isocyanurate component in an amount of at least 20 wt. % percent, based on total weight of the polymerizable liquid, and an organophosphate component comprising one or more organophosphate compounds. The polymerizable liquid is printed and cured to form the article. In some embodiments, the polymerizable liquid also comprises an acrylate component. The acrylate component can comprise acrylate monomer, acrylate oligomer, or mixtures thereof.

As described further herein, the polymerizable liquid may further comprise a photoinitiator component, and curing of the polymerizable liquid may occur by irradiation of the liquid with light of the appropriate wavelength to initial free radical polymerization.

In some embodiments, layers of polymerizable liquids can be deposited according to an image of the 3D article in a computer readable format during formation of the three-dimensional article. The polymerizable liquid can be deposited according to preselected computer aided design (CAD) parameters. Moreover, in some cases, one or more layers of the polymerizable liquid described herein has a thickness of about 10 μm to about 100 μm, about 10 μm to about 80 μm, about 10 μm to about 50 μm, about 20 μm to about 100 μm, about 20 μm to about 80 μm, or about 20 μm to about 40 μm. Other thicknesses are also possible.

Additionally, it is to be understood that methods of printing a 3D article described herein can include so-called "multi-jet" or "stereolithography" 3D printing methods. For example, in some instances, a multi-jet method of printing a 3D article comprises selectively depositing layers of a polymerizable liquid described herein onto a substrate, such as a build pad of a 3D printing system. In addition, in some embodiments, a method described herein further comprises supporting at least one of the layers of the polymerizable liquid with a support material. Any support material not inconsistent with the objectives of the present disclosure may be used.

It is also possible to form a 3D article from a polymerizable liquid described herein using stereolithography. For example, in some cases, a method of printing a 3D article comprises retaining the polymerizable liquid in a container and selectively applying energy to the polymerizable liquid in the container to solidify at least a portion of a polymerizable liquid, thereby forming a solidified layer that defines a cross-section of the 3D article. Additionally, a method described herein can further comprise raising or lowering the solidified layer to provide a new or second layer of polymerizable liquid, followed by again selectively applying energy to the polymerizable liquid in the container to solidify at least a portion of the new or second polymerizable liquid that defines a second cross-section of the 3D article. Further, the first and second cross-sections of the 3D article can be bonded or adhered to one another in the z-direction (or build direction corresponding to the direction of raising or lowering recited above) by the application of the energy for solidifying the polymerizable liquid. Moreover, selectively applying energy to the polymerizable liquid in the container can comprise applying electromagnetic radiation, such as UV and/or visible radiation, having a sufficient energy to initiate polymerization of the polymerizable material as described herein. In addition, in some cases, raising or lowering a solidified layer of polymerizable liquid is carried out using an elevator platform disposed in the container of fluid build material. A method described herein can also comprise planarizing a new layer of polymerizable liquid provided by raising or lowering an elevator platform. Such planarization can be carried out, in some cases, by a wiper or roller.

Articles printed according to methods described herein can exhibit one or more desirable mechanical properties. 3D articles printed from polymerizable liquids described herein may display a tensile modulus of at 2700-3200 MPa, in some embodiments. A 3D printed article, in some embodiments, can exhibit a tensile strength of at least 55-65 MPa. Values for tensile strength and tensile modulus provided herein can be determined according to ASTM D638.

Articles printed according to methods described herein can also exhibit desirable flame resistant and/or flame retardant properties. The articles, for example, can exhibit a limiting oxygen index (LOI) of 25-30% or 28-30% according to ISO 4589. Additionally, articles printed according to methods described herein can be compliant with the provisions of 14 C.F.R. § 23.2325.

These foregoing embodiments are further illustrated in the following non-limiting examples.

EXAMPLES

Table 1 provides a formulation of a polymerizable liquid according to some embodiments described herein.

TABLE 1

| Polymerizable Liquid | |
|---|---|
| Component | Formula 1 |
| Difunctional urethane acrylate | 16 |
| Polyacrylate isocyanurate | 27.2 |

TABLE 1-continued

| Polymerizable Liquid | |
|---|---|
| Component | Formula 1 |
| Difunctional acrylate | 7.2 |
| Polyallyl isocyanurate | 27.2 |
| Bis(diphenyl phosphate) | 20 |
| Photoinitiator | 2.4 |
| Total % weight | 100.0 |

Three rectangular strips each having thickness of 3 mm were printed from the polymerizable liquid of Formula 1. The strips had sufficient length and width for vertical flame testing in compliance the 14 C.F.R. § 23.2325. Burn length is the distance from the original edge to the farthest evidence of damage to the test specimen due to flame impingement, including areas of partial or complete consumption, charring, or embrittlement, but not including areas sooted, stained, warped, or discolored, nor areas where material has shrunk or melted from the heat source. Acceptance or pass criteria are as follows:

Afterflame: 15.0 seconds maximum average

Drip Burn: 5.0 seconds maximum average

Burn Length: 8.0 inches maximum average

The results of the vertical flame testing for the three sample strips is provided in Table 2:

TABLE 2

| Vertical Flame Test Results | | | |
|---|---|---|---|
| Sample | Afterflame (seconds) | Drip Burn (seconds) | Burn Length (inches) |
| 1 | 0.8 | 0 | 0.1 |
| 2 | 0.7 | 0 | 0.1 |
| 3 | 0.8 | 0 | 0.1 |
| Average | 0.8 | 0 | 0.1 |

As provided in Table 2, the printed samples passed the vertical flame test, exhibiting substantial flame resistance.

Additional non-limiting example embodiments are described below.

Embodiment 1. A polymerizable liquid comprising:

a curable isocyanurate component in an amount of at least 20 wt. %, based on total weight of the polymerizable liquid; and an organophosphate component comprising one or more organophosphate compounds.

Embodiment 2. The polymerizable liquid of Embodiment 1, wherein the curable isocyanurate component is polymerizable via free radical polymerization.

Embodiment 3. The polymerizable liquid of Embodiment 1 or Embodiment 2, wherein the curable isocyanurate component comprises isocyanurate polyacrylate, polyallyl isocyanurate, or mixture thereof.

Embodiment 4. The polymerizable liquid of any of the preceding Embodiments, wherein the isocyanurate polyacrylate is of Formula I:

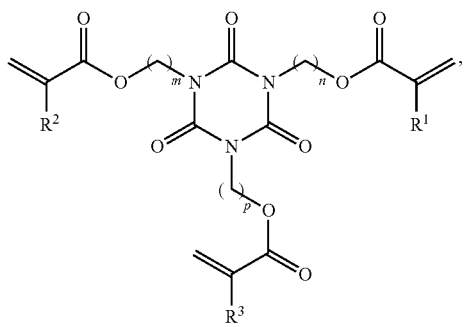

wherein $R^1$-$R^3$ are independently selected from the group consisting of hydrogen and alkyl and m, n, and p are integers independently ranging from 1 to 10.

Embodiment 5. The polymerizable liquid of any of the preceding Embodiments, wherein the polyallyl isocyanurate is of Formula II:

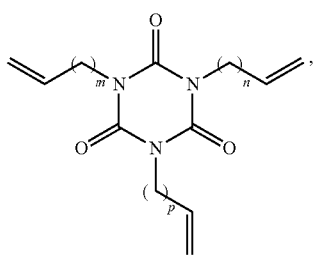

wherein m, n, and p are integers independently ranging from 1 to 10.

Embodiment 6. The polymerizable liquid of any of the preceding Embodiments, wherein the organophosphate component is present in an amount of 10-40 wt. %, based on total weight of the polymerizable liquid.

Embodiment 7. The polymerizable liquid of any of the preceding Embodiments, wherein the one or more organophosphate compounds are of Formula III:

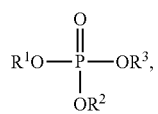

wherein $R^1$-$R^3$ are independently selected from the group consisting of hydrogen, alkyl, alkenyl, alkynyl, cycloalkyl, heteroalkyl, heteroalkenyl, heterocyclyl, aryl, and heteroaryl.

Embodiment 8. The polymerizable liquid of any of the preceding Embodiments, wherein the one or more organophosphate compounds comprise bis(organophosphate).

Embodiment 9. The polymerizable liquid of any of the preceding Embodiments, wherein the curable isocyanurate component is present in an amount of 30-80 weight percent based on total weight of the polymerizable liquid.

Embodiment 10. The polymerizable liquid of any of the preceding Embodiments further comprising an acrylate component.

Embodiment 11. The polymerizable liquid of Embodiment 10, wherein the acrylate component is present in an amount of 30-70 wt. % based on total weight of the polymerizable liquid.

Embodiment 12. The polymerizable liquid of Embodiment 10 or Embodiment 11, wherein the acrylate component comprises a mixture of acrylate monomer and acrylate oligomer.

Embodiment 13. The polymerizable liquid of any of the preceding Embodiments further comprising a photoinitiator component.

Embodiment 14. The polymerizable liquid of Embodiment 13, wherein the photoinitiator component is present in an amount of 0.1-5 weight percent based on total weight of the polymerizable liquid.

Embodiment 15. A method of printing a three-dimensional article comprising:
  providing a polymerizable liquid of any of Embodiments 1-14, such as a polymerizable liquid comprising:
    a curable isocyanurate component in an amount of at least 20 wt. %, based on total weight of the polymerizable liquid; and
    an organophosphate component comprising one or more organophosphate compounds; and
    printing and curing the polymerizable liquid with light to form the article.

Embodiment 16. The method of Embodiment 15, wherein the article has a limiting oxygen index of 25-30% according to ISO 4589.

Embodiment 17. The method of Embodiment 15 or Embodiment 16, wherein the article has a limiting oxygen index of 28-30% according to ISO 4589.

Embodiment 18. The method of any of Embodiments 15-17, wherein the polymerizable liquid is provided in a layer-by-layer process.

Embodiment 19. The method of any of Embodiments 15-18, wherein the polymerizable liquid further comprises a photoinitiator component and curing the polymerizable liquid proceeds via free radical polymerization.

Embodiment 20. The method of any of Embodiments 15-19, wherein the curable isocyanurate component comprises isocyanurate polyacrylate, polyallyl isocyanurate, or mixtures thereof.

Embodiment 21. The method of Embodiment 20, wherein the isocyanurate polyacrylate is of Formula I:

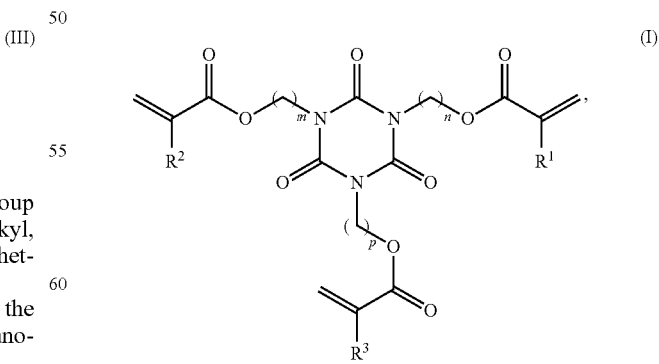

wherein $R^1$-$R^3$ are independently selected from the group consisting of hydrogen and alkyl and m, n, and p are integers independently ranging from 1 to 10.

Embodiment 22. The method of Embodiment 20, wherein the polyallyl Isocyanurate is of Formula II:

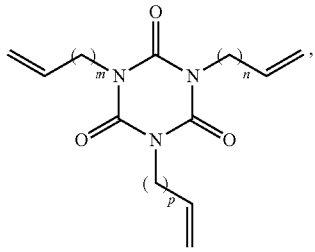
(II)

wherein m, n, and p are integers independently ranging from 1 to 10.

Embodiment 23. The method of any of Embodiments 15-22, wherein the organophosphate component is present in an amount of 10-40 wt. %, based on total weight of the polymerizable liquid.

Embodiment 24. The method of any of Embodiments 15-23, wherein the one or more organophosphate compounds are of the formula:

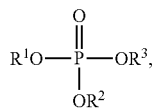

wherein $R^1$-$R^3$ are independently selected from the group consisting of hydrogen, alkyl, alkenyl, alkynyl, cycloalkyl, heteroalkyl, heteroalkenyl, heterocyclyl, aryl, and heteroaryl.

Embodiment 25. The method of any of Embodiments 15-24, wherein the one or more organophosphate compounds comprise a bis(organophosphate).

Embodiment 26. The method of any of Embodiments 15-25, wherein the curable isocyanurate is present in an amount of 30-80 weight percent based on total weight of the polymerizable liquid.

Embodiment 27. The method of any of Embodiments 15-26, wherein the polymerizable liquid further comprises an acrylate component.

Embodiment 28. The method of Embodiment 27, wherein the acrylate component is present in an amount of 30-70 wt. % based on total weight of the polymerizable liquid.

Embodiment 29. The method of Embodiment 27 or Embodiment 28, wherein the acrylate component comprises a mixture of acrylate monomer and acrylate oligomer.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A polymerizable liquid comprising:
   a curable isocyanurate component in an amount of at least 20 wt. %, based on total weight of the polymerizable liquid; and
   an organophosphate component comprising one or more organophosphate compounds,
   wherein the curable isocyanurate component comprises a mixture of isocyanurate polyacrylate and polyallyl isocyanurate.

2. The polymerizable liquid of claim 1, wherein the curable isocyanurate component is polymerizable via free radical polymerization.

3. The polymerizable liquid of claim 1, wherein the isocyanurate polyacrylate is of Formula I:

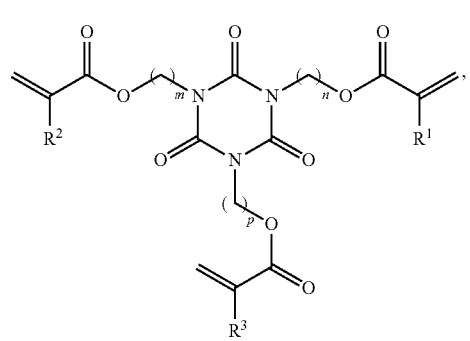
(I)

wherein $R^1$-$R^3$ are each independently selected from the group consisting of hydrogen and alkyl and m, n, and p are each integers independently ranging from 1 to 10.

4. The polymerizable liquid of claim 1, wherein the polyallyl isocyanurate is of Formula II:

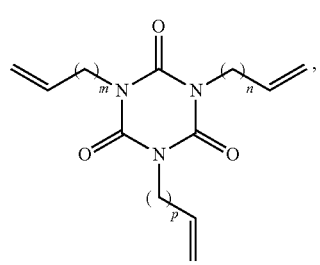
(II)

wherein m, n, and p are integers independently ranging from 1 to 10.

5. The polymerizable liquid of claim 1, wherein the organophosphate component is present in an amount of 10-40 wt. %, based on total weight of the polymerizable liquid.

6. The polymerizable liquid of claim 1, wherein the one or more organophosphate compounds are of the formula:

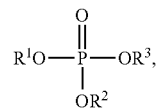

wherein $R^1$-$R^3$ are independently selected from the group consisting of hydrogen, alkyl, alkenyl, alkynyl, cycloalkyl, heteroalkyl, heteroalkenyl, heterocyclyl, aryl, and heteroaryl.

7. The polymerizable liquid of claim 1, wherein the one or more organophosphate compounds comprise bis (organophosphate).

8. The polymerizable liquid of claim 1, wherein the curable isocyanurate component is present in an amount of 30-80 wt. %, based on total weight of the polymerizable liquid.

9. The polymerizable liquid of claim 1 further comprising an acrylate component.

10. The polymerizable liquid of claim 9, wherein the acrylate component is present in an amount of 30-70 wt. %, based on total weight of the polymerizable liquid.

11. The polymerizable liquid of claim 9, wherein the acrylate component comprises a mixture of acrylate monomer and acrylate oligomer.

12. The polymerizable liquid of claim 1 further comprising a photoinitiator component.

13. The polymerizable liquid of claim 12, wherein the photoinitiator component is present in an amount of 0.1-5 wt. %, based on total weight of the polymerizable liquid.

* * * * *